(12) United States Patent
Sanson et al.

(10) Patent No.: US 10,938,245 B1
(45) Date of Patent: Mar. 2, 2021

(54) UNIVERSAL RESONANT INDUCTION COUPLING FOR LUMINAIRE IN A HIGH-MOISTURE ENVIRONMENT

(71) Applicant: BELLSON ELECTRIC PTY LTD, Caringbah (AU)

(72) Inventors: John Clifford Sanson; David John Sanson, Taren Point (AU)

(73) Assignee: BELLSON ELECTRIC PTY LTD

( * ) Notice: Subject to any disclaimer, the term of this patent is extended or adjusted under 35 U.S.C. 154(b) by 0 days.

(21) Appl. No.: 16/502,748

(22) Filed: Jul. 3, 2019

Related U.S. Application Data

(60) Provisional application No. 62/694,892, filed on Jul. 6, 2018.

(51) Int. Cl.
*H02J 50/12* (2016.01)
*H01F 38/14* (2006.01)
(Continued)

(52) U.S. Cl.
CPC .............. *H02J 50/12* (2016.02); *F21V 15/01* (2013.01); *F21V 23/02* (2013.01); *F21V 31/00* (2013.01);
(Continued)

(58) Field of Classification Search
CPC .......... H02J 50/12; F21V 15/01; F21V 23/02; F21V 31/00; H01F 38/14; F21W 2131/401
See application file for complete search history.

(56) References Cited

U.S. PATENT DOCUMENTS 4,782,430 A * 11/1988 Robbins ............... G02B 6/0008
285/136.1
5,135,717 A 8/1992 Renzoni et al. ................ 422/61
(Continued)

FOREIGN PATENT DOCUMENTS

AU    2011338154    6/2016    ............... E04H 4/16
CN    105188230    12/2015    ............. H05B 37/02
(Continued)

OTHER PUBLICATIONS

"Colin" catalog, 2016, ShangHai Colin Semiconductor Lighting Co., Ltd, 35 pgs.
(Continued)

*Primary Examiner* — Alexander K Garlen
*Assistant Examiner* — Christopher E Dunay
(74) *Attorney, Agent, or Firm* — Hayes Soloway P.C.

(57) ABSTRACT

An induction luminaire system for use in high-moisture environments includes a transmitter coupling structure housing an induction transmitter having a first planar coil. An exterior of the transmitter coupling structure is engageable with a wall fitting or a lighting niche. The transmitter coupling structure has a rear surface which extends into the wall fitting or the lighting niche not more than a predetermined distance. An induction receiver has a second planar coil to receive an induction signal from the first planar coil, wherein the induction receiver is in electrical communication with the light module, and wherein the induction receiver provides power from the received induction signal to a light module. A receiver coupling structure houses the induction receiver and having an interior recess, wherein a portion of the transmitter coupling structure housing the first planar coil is removably positionable within the interior recess.

14 Claims, 13 Drawing Sheets

(51) Int. Cl.
*F21V 15/01* (2006.01)
*F21V 31/00* (2006.01)
*F21V 23/02* (2006.01)
*F21W 131/401* (2006.01)

(52) U.S. Cl.
CPC ....... *H01F 38/14* (2013.01); *F21W 2131/401* (2013.01)

(56) References Cited

U.S. PATENT DOCUMENTS

| | | | |
|---|---|---|---|
| 5,301,096 A | 4/1994 | Klontz et al. | 363/37 |
| 5,494,793 A | 2/1996 | Schindele et al. | 435/6 |
| 6,188,179 B1 | 2/2001 | Boys et al. | 315/244 |
| 6,301,128 B1 | 10/2001 | Jang et al. | 363/17 |
| 6,459,218 B2 | 10/2002 | Boys et al. | 315/324 |
| 6,825,620 B2 | 11/2004 | Kuennen et al. | 315/224 |
| 7,125,146 B2 | 10/2006 | Willis et al. | 162/267 |
| 7,178,178 B2 | 2/2007 | Hutchings | 4/496 |
| 7,178,941 B2 | 2/2007 | Roberge et al. | 362/225 |
| 7,180,248 B2 | 2/2007 | Kuennen et al. | 315/224 |
| 7,182,484 B2 | 2/2007 | Buelow, II et al. | 362/267 |
| 7,722,216 B2 * | 5/2010 | Amor | B63B 45/02 362/249.01 |
| 8,030,851 B2 | 10/2011 | Vernondier et al. | 315/149 |
| RE43,492 E | 6/2012 | Willis et al. | 362/267 |
| 8,502,464 B2 * | 8/2013 | Lakirovich | H05B 45/20 315/276 |
| 9,033,557 B2 | 5/2015 | Potucek et al. | F21V 21/047 |
| 9,046,247 B2 | 6/2015 | Potucek et al. | F21V 15/01 |
| 9,100,999 B2 | 8/2015 | Li | H05B 37/02 |
| 9,299,493 B2 | 3/2016 | Kuennen et al. | H01F 38/14 |
| 9,502,907 B2 | 11/2016 | Potucek et al. | H02J 5/005 |
| 9,544,964 B2 | 1/2017 | Li | H05B 33/0845 |
| 9,590,456 B2 | 3/2017 | Kuennen et al. | H02J 50/10 |
| 10,381,872 B2 | 8/2019 | Potucek et al. | |
| 2002/0130627 A1 | 9/2002 | Morgan et al. | 315/291 |
| 2004/0184284 A1 | 9/2004 | Buelow, II et al. | 362/547 |
| 2006/0022214 A1 | 2/2006 | Morgan et al. | 257/99 |
| 2006/0101567 A1 * | 5/2006 | Hutchings | H02J 5/005 4/496 |
| 2011/0031740 A1 | 2/2011 | Stone | 285/139.2 |
| 2011/0267834 A1 | 11/2011 | Potucek et al. | 362/551 |
| 2013/0098712 A1 | 4/2013 | Svendsen et al. | 187/381 |
| 2013/0182442 A1 | 7/2013 | Potucek et al. | 362/294 |
| 2013/0249479 A1 | 9/2013 | Partovi | H02J 7/00 |
| 2014/0092606 A1 | 4/2014 | Potucek et al. | 362/365 |
| 2014/0203710 A1 | 7/2014 | Li | 315/129 |
| 2014/0268824 A1 | 9/2014 | Potucek et al. | 362/366 |
| 2014/0336821 A1 | 11/2014 | Blaine et al. | 700/275 |
| 2015/0005024 A1 | 1/2015 | Fudicker | H04W 72/04 |
| 2015/0042223 A1 | 2/2015 | Harrington | 315/70 |
| 2015/0260375 A1 | 9/2015 | Potucek et al. | F21V 15/01 |
| 2016/0323952 A1 * | 11/2016 | Li | H05B 47/19 |
| 2017/0073990 A1 | 3/2017 | Potucek et al. | E04H 4/1654 |
| 2017/0073991 A1 | 3/2017 | Potucek et al. | E04H 4/1654 |
| 2017/0133882 A1 | 5/2017 | Kuennen et al. | H02J 50/10 |
| 2017/0167717 A1 | 6/2017 | Duarte | F21V 31/005 |
| 2017/0212489 A1 | 7/2017 | Potucek et al. | G05B 19/042 |
| 2017/0292686 A1 | 10/2017 | Fuller et al. | F21V 21/15 |
| 2018/0138745 A1 * | 5/2018 | Maud | H02J 50/10 |
| 2019/0334368 A1 * | 10/2019 | Wambugu Ngahu | H02J 7/025 |

FOREIGN PATENT DOCUMENTS

| | | | |
|---|---|---|---|
| CN | 108668405 | 10/2018 | H05B 33/08 |
| CN | 109743816 | 5/2019 | H05B 33/08 |
| FR | 2 998 104 | 5/2016 | H01R 43/26 |
| WO | WO 02/101702 | 12/2002 | G09G 3/22 |
| WO | WO 2016/176653 | 12/2002 | H01F 38/14 |
| WO | WO 2017/086520 | 5/2017 | G08C 23/04 |

OTHER PUBLICATIONS

"MOD LITE Power Pass Wireless" S.R.Smith, LLC, 2019, 1 pg.
YouTube video published Sep. 21, 2009, https://www.youtube.com/watch?v=2IAHkm4RFd4, 2 pgs.
Office Action issued in U.S. Appl. No. 16/543,092, dated Dec. 4, 2019 (17 pgs).
Examination Report issued in Australian Application No. 2020205322 dated Sep. 8, 2020, 7 pgs.
Office Action issued in Canadian Application No. 3,086,364 dated Sep. 2, 2020, 3 pgs.

* cited by examiner

UNIVERSAL RESONANT INDUCTION COUPLING FOR LUMINAIRE IN A HIGH-MOISTURE ENVIRONMENT

CROSS REFERENCE TO RELATED APPLICATION

This application claims benefit of U.S. Provisional Application Ser. No. 62/694,892 entitled, "Universal Resonant Induction Coupling for Luminaire in a High-Moisture Environment" filed Jul. 6, 2018, the entire disclosure of which is incorporated herein by reference.

FIELD OF THE DISCLOSURE

The present disclosure is generally related to luminaires and more particularly is related to induction coupling for luminaires used in high-moisture environments.

BACKGROUND OF THE DISCLOSURE

Aquatic lights are commonly used in swimming pools, spas, and other underwater installations. Most modern swimming pool lights have a housing designed to limit the light's protrusion out into the pool. The luminaire—the portion of the light unit that includes the lamp and all components directly associated with the distribution, positioning, and protection of the light unit—often has a fixed gland entry point where a conductor enters the luminaire and makes a connection therein. This design requires significant depth in construction to allow internal space for the gland assembly. In turn, the luminaire must be large. Another design is the plug-in design, which has male and female pins connecting at a point either internal or external to the luminaire. Similarly, this design requires a large space within the luminaire body. Plug-in designs may be either a direct plug connection to the luminaire, which requires an entry point to the luminaire and the conductor, or an in-line plug, where a branch conductor from the luminaire consists of a male or female pin design external to the luminaire. Both of the plug-in designs require an entry point for connection to the luminaire.

Even current induction luminaires, which minimize the need for direct connections between some components, extend several inches back into wall fittings and niches because their design and arrangement of hardware components require a considerable amount of space for operation. For example, induction luminaires that use cylindrical or helical coils to transfer electrical power via induction require that the coil lengths be several inches in order to provide enough surface area to induce sufficient power transfer. These coils are frequently too long to fit into some installations, and they may require significant modification of the installation area in order to fit into others.

As a result of these designs, installation, maintenance, repair, and upgrading of aquatic lighting requires significant space, complicated access procedures, and watertight designs that are difficult to disassemble and reassemble. In areas with limited space, this can affect light placement. Where maintenance and repair are concerned, this can increase repair times and costs significantly. Especially where swimming pools and spas are contained by a concrete or stone surface, the underwater lighting niche cannot be expanded beyond its original size without removing some or all of the concrete or stone surface of the pool or spa, which is very costly. Most owners are not willing to undertake these costly renovations to replace or upgrade a light fixture.

Finally, these types of watertight designs are not always effective after installation and maintenance; water can often enter the luminaire and destroy critical components.

Thus, a heretofore unaddressed need exists in the industry to address the aforementioned deficiencies and inadequacies.

SUMMARY OF THE DISCLOSURE

Embodiments of the present disclosure provide an apparatus for a retrofittable underwater induction luminaire system. Briefly described, in architecture, one embodiment of the system, among others, can be implemented as follows. An induction transmitter has a first planar coil. A transmitter coupling structure houses the induction transmitter, wherein an exterior of the transmitter coupling structure is engageable with at least one of: an interior of an underwater wall fitting and an interior of an underwater lighting niche, wherein the transmitter coupling structure has a rear surface, and wherein the rear surface extends into at least one of the wall fitting and the underwater lighting niche not more than a predetermined distance. An induction receiver has a second planar coil to receive an induction signal from the first planar coil, wherein the induction receiver is in electrical communication with the light module, and wherein the induction receiver provides power from the received induction signal to a light module. A receiver coupling structure houses the induction receiver and having an interior recess, wherein a portion of the transmitter coupling structure housing the first planar coil is removably positionable within the interior recess.

The present disclosure can also be viewed as providing an induction lighting system for use in high-moisture environments. Briefly described, in architecture, one embodiment of the system, among others, can be implemented as follows. The induction lighting system for use in high-moisture environments includes an aquatic body and an induction luminaire. The induction luminaire includes an induction transmitter having a first planar coil. A transmitter coupling structure houses the induction transmitter. An induction receiver has a second planar coil to receive an induction signal from the first planar coil, wherein the induction receiver is in electrical communication with the light module, and wherein the induction receiver provides power from the received induction signal to a light module. A receiver coupling structure houses the induction receiver and having an interior recess, wherein a portion of the transmitter coupling structure housing the first planar coil is removably positionable within the interior recess. A power source is in electrical communication with the induction luminaire. At least one of a wall fitting and a lighting niche is located at a wall or floor of the aquatic body, wherein the transmitter coupling is engaged with the at least one of the wall fitting and the lighting niche, and wherein the transmitter coupling structure has a rear surface that extends into the at least one of the wall fitting and the underwater lighting niche not more than a predetermined distance.

The present disclosure can also be viewed as providing an induction system for use in a high-moisture environment. Briefly described, in architecture, one embodiment of the system, among others, can be implemented as follows. An induction receiver has a planar coil to receive an induction signal from a planar coil of an induction transmitter, whereby the planar coil of the induction receiver is in electrical communication with an electrical load through the planar coil of the induction transmitter. The induction receiver is positioned in a moisture-impervious housing structure. The moisture-tight housing has an interior recess formed on a sidewall thereof, wherein at least a portion of the induction transmitter having the planar coil is positionable within the interior recess during transmission and reception of the induction signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
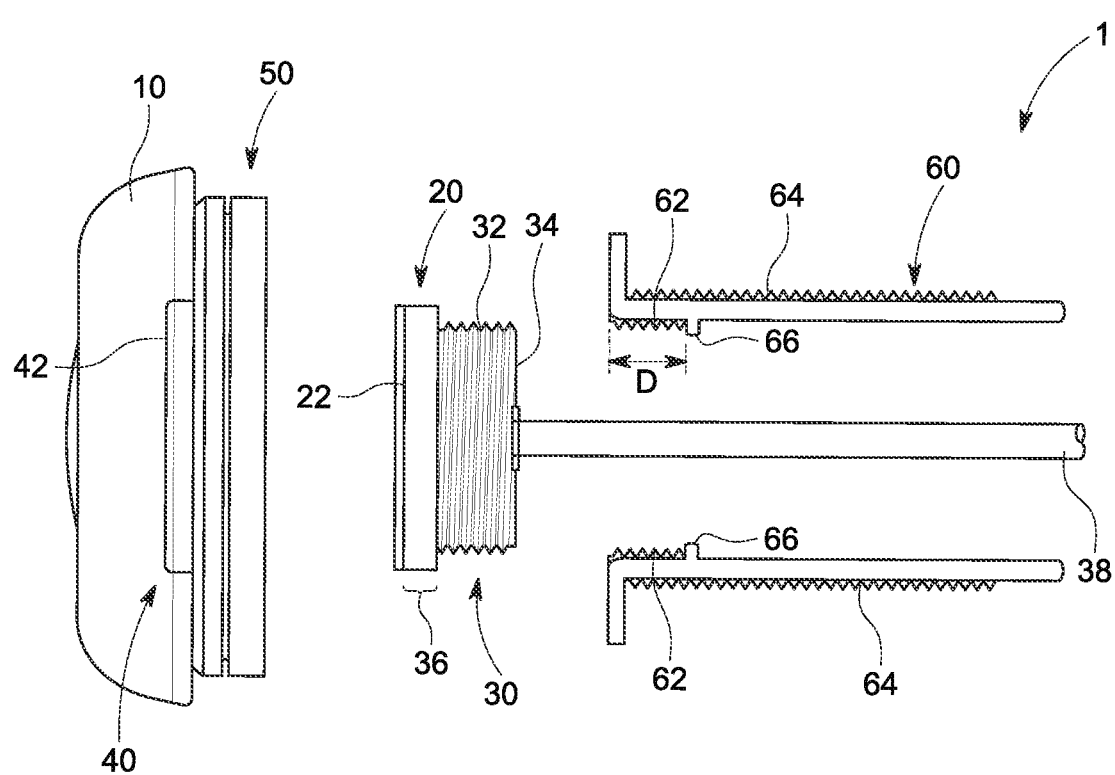
FIGS. 1A-1B are exploded cross-sectional and cross-sectional illustrations of a retrofittable underwater induction luminaire, in accordance with a first exemplary embodiment of the present disclosure.
Figure 1B:
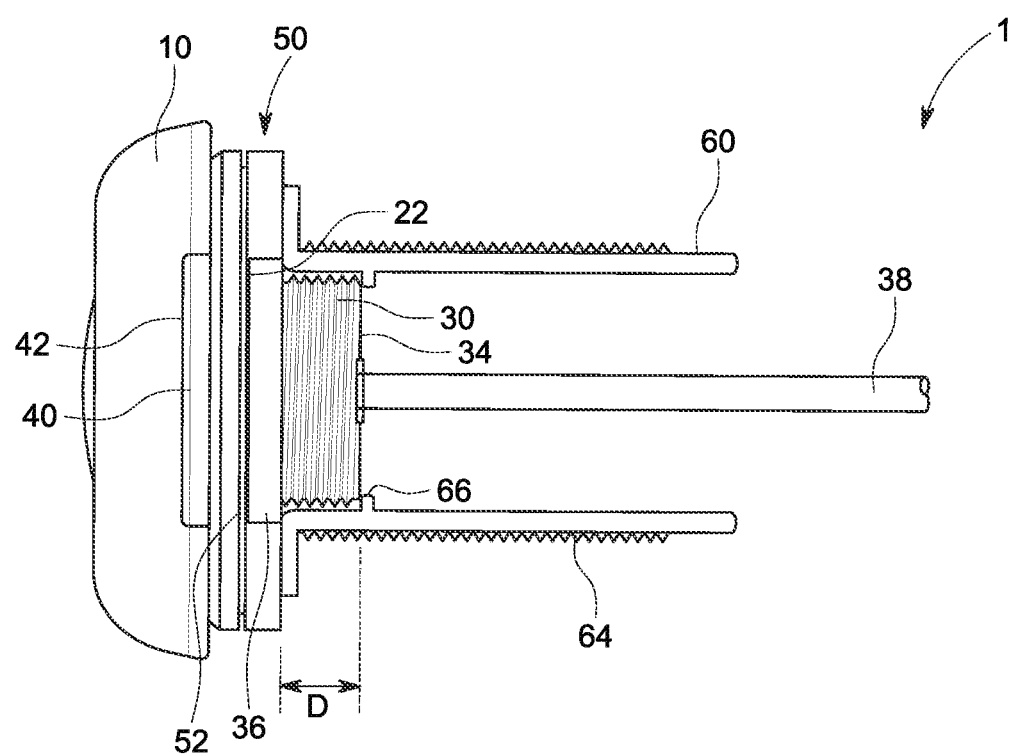

FIGS. 1A-1B are exploded cross-sectional and cross-sectional illustrations of a retrofittable underwater induction luminaire, in accordance with a first exemplary embodiment of the present disclosure.

FIG. 1A shows a retrofittable underwater induction luminaire 1 (hereinafter "luminaire") including a light module 10, an induction transmitter 20 having a first planar coil 22, and an induction receiver 40 having a second planar coil 42 to receive an induction signal. The induction receiver 40 is in electrical communication with the light module 10. The induction receiver 40 provides power from the received induction signal to the light module 10. A transmitter coupling structure 30 houses the induction transmitter 20. An exterior 32 of the transmitter coupling structure is engageable with an interior of an underwater wall fitting 60. The transmitter coupling structure 30 has a rear surface 34 that extends into the wall fitting 60 not more than a predetermined distance D. In one example, the predetermined distance is not more than 1.75 inches. A receiver coupling structure 50 houses the induction receiver 40.

The luminaire 1 may be an apparatus that includes the lamp and all components directly associated with the distribution, positioning, and protection of the light module. The light module 10 may be any lamp, bulb, LED, OLED, other device, or combination of devices for emitting light. The emitted light may be continuous or strobed. The emitted light may be one or more colors, for instance, a combination of red, green, and blue (RGB) light used to create a large number of colors in the visible spectrum. In one example, the light may be variable, and may be changed depending on a user's command, time of day, water temperature, ambient temperature, surrounding area, other factors, or any combination thereof. In another example, the light may include a light module, which may comprise a number of LEDs located on a circuit board. The light module 10 may include logic and other circuits to control and manipulate the emitted light.

The induction transmitter 20 may be an electronic component or group of components for transmitting an induction signal to the induction receiver 40. In particular, the induction transmitter 20 may include a first planar coil 22. In one example, the coil may be a planar spiral coil 22 located within a transmitter coupling structure 30. The planar spiral coil 22 may be square, circular, or any other coil design suitable for resonant induction transmission. The transmitter coupling structure 30 may include a portion sized and shaped to enclose the transmitter coil 22 and to prevent water from entering the coupling structure 30. The transmitter coupling structure 30 may also have an exterior 32 sized and shaped to be engageable with an underwater wall fitting 60. In one example, the exterior 32 of the transmitter coupling structure 30 may be substantially circular in shape and at least partially threaded. The exterior threading on the exterior 32 may be sized to engage with the interior threading 62 of an underwater wall fitting. The wall fitting 60 may additionally have exterior threading 64 to engage with a lighting niche or other installation space within a pool, spa, or other aquatic body. In one example, the exterior 32 of the transmitter coupling structure 30 may have an outer diameter of 1½ inches, and may be shaped as a short cylinder. In another example, the exterior 32 of the transmitter coupling structure 30 may initially be shaped to engage with a 1½ inch wall fitting while leaving space for the wall fitting to engage with a reducing adapter. This is discussed in greater detail in FIG. 6, below.

The luminaire 1 may also include an induction receiver 40 for receiving the induction signal from the induction transmitter 20 and converting it to an electrical power signal. The induction receiver 40 may be an electronic component or group of components for receiving the induction signal. In particular, the induction receiver 40 may include a second planar coil 42, which may similarly be a planar spiral coil 42. In one example, the second planar coil 42 is sized and shaped to match a resonance frequency of the planar spiral coil 22. This may allow optimal transfer of the induction signal between the coils 22, 42. The second planar coil 42 may be located within a receiver coupling structure 50. The receiver coupling structure 50 may be a housing for the second planar coil 42 and additional electronic components. In one example, the receiver coupling structure 50 may be circular. In general, the receiver coupling structure 50 may be larger than the transmitter coupling structure 30, such that a portion 36 of the transmitter coupling structure 30 may fit within the receiver coupling structure 50 when the two pieces are coupled together. The receiver coupling structure 50 may also partially house or be attached to the light module 10 such that they are a single piece.

When engaged, the rear surface 34 of the transmitter coupling structure 30 may extend into the wall fitting 60 not more than the predetermined distance D, as measured from a front face of the wall fitting 60. In one example, the predetermined distance is substantially 1.75 inches. In other examples, the predetermined distance D may be equal to or substantially equal to less than 1.25 inches, 1.50 inches, 2.0 inches, 2.25 inches, 2.5 inches or another distance. It is noted that the transmitter coupling structure 30 may be short compared to the coupling structures or housings of traditional underwater luminaires, which may extend several inches back into fittings. These conventional coupling structures or housings extend back more than 1.75 inches, or more commonly, extend back usually between 2.5-6.0 or more inches. Other induction luminaires often use non-planar coils, such as cylindrical or helical coils for induction. These coils may be several inches in length in order to provide enough surface area for the required induction power transfer. The receiver coil may be placed within the transmitter coil in order to achieve induction transfer. This requires a significant volume of space for the two coils, which requires the transmitter coupling structure to be large in turn. The present disclosure uses planar coils 22, 42 for induction. The planar coils 22, 42 are wire coiled about a two-dimensional plane, retaining a relatively flat, planar form factor. Therefore, they do not require significant length like the cylindrical coil designs. Furthermore, the planar coils 22, 42 are designed and positioned relative to one another to share a resonant frequency. This increases the power transfer efficiency between the transmitter and receiver coils 22, 42 without requiring a large surface area. Consequently, the two planar coils 22, 42 can be positioned relatively close to one another, maintaining a short required distance between them on the order of a few millimeters. When the coils 22, 42 are coupled together with the transmitter and receiver coupling structures 30, 50, the result is a thin, short, induction system. In one example, the interior recess of the receiver coupling structure 50 allows the transmitter coupling structure 30 to be placed within the recess, thus shortening the length of the coupled structure even further.

The short form factor allows the luminaire 1 to be retrofitted to most standard wall fittings without the need to create additional space for the rear 34 of the housing or the electrical wiring 38. In one example, the transmitter coupling structure 30 may extend substantially less than a predetermined distance D, such as 1.75 inches, into the wall fitting 60 when engaged. As shown in FIG. 1A, and further in FIG. 1B below, this length may be short enough that the luminaire 1 does not extend past an interior shelf 66 of a wall fitting 60. The shelf 66, which may be a small, annular shelf within the interior of the wall fitting 60, may be located past the internal threading 62 of the wall fitting 60. The shelf 66 may limit the diameter of any elements extending further into the fitting. Thus, it is advantageous for the rear 34 of the housing structure to not extend beyond this point—otherwise, it would not fit with the wall fitting.

FIG. 1B shows the luminaire 1 assembled together. The receiver coupling structure 50 may have an interior recess 52 of a slightly larger diameter than the portion of the transmitter coupling structure 30 housing the first planar coil 22. The transmitter coupling structure 30 may be inserted into the receiver coupling structure 50 when the two coupling structure pieces 30, 50 are attached. FIG. 1B shows that the interior recess 52 is located just behind the second planar coil 42. When the transmitter coupling structure 30 is inserted into the receiver coupling structure 50, the two planar coils 22, 42 may be positioned at a fixed distance apart and axially aligned, i.e., co-axial. When the coils 22, 42 are circular spiral coils, they may be aligned through the center of the spiral. In one example, the interior recess 52 may be located in and around the center of the receiver coupling structure 50.

The coils 22, 42 in the induction transmitter 20 and the induction receiver 40 may be spaced apart at a fixed distance suitable for transmission and reception of a wireless induction signal. In one example, this distance may be on the order of several millimeters. In another example, this distance may be greater or smaller depending on the materials used, the power transmission requirements, and the resonant frequency of the coils. In one example, when the coils 22, 42 are separated by a distance of between about 5-40 millimeters, up to 10 watts of electrical power may be transferrable from the induction transmitter 20 to the induction receiver 40.

The induction transmitter and induction receiver coupling structures 30, 50 may be manufactured by any suitable process. In one example, a low pressure molding process may be used to encapsulate and environmentally protect the electronic components and the coils therein. This may ensure a seal against water, dust, dirt, and vibration. The coupling structures 30, 50 may be made from any suitable materials, including plastics, ceramics, metals, polymers, or any combination thereof. In one example, the transmitter coupling structure 30 may be overmolded with the internal components, including wiring 38, first planar coil 22, and electronics such as a printed circuit board to ensure a watertight seal. In this example, a plastic pin may be placed between the printed circuit board and the planar coil 22 to maintain a precise distance between the components during the molding process.

The coupling structures 20, 40 may be attached and detached by any suitable method and engagement hardware.

In one example, threading may be used. In another example, as shown in FIGS. 1A-1B, a bayonet or push-release system may be used. In yet another example, a snap fitting may be used to attach the couplings.

In one example, the luminaire 1 may include a number of transmitter coils to activate particular LEDs within the light module 10. For instance, a light module 10 may have an LED array with red, green, and blue LEDs (RGB) that can be combined to create millions of color variations. Each color of LED may have a receiver coil in communication with a transmitter coil such that the power intensity to each color may be separately controllable. A user can create or select custom color options by adjusting the strength of the electrical signal to each RGB receiver coil. As another example, a controller within the luminaire 1 may change colors based on time of day, ambient conditions, a pre-programmed routine, or other factors.

Figure 2A:
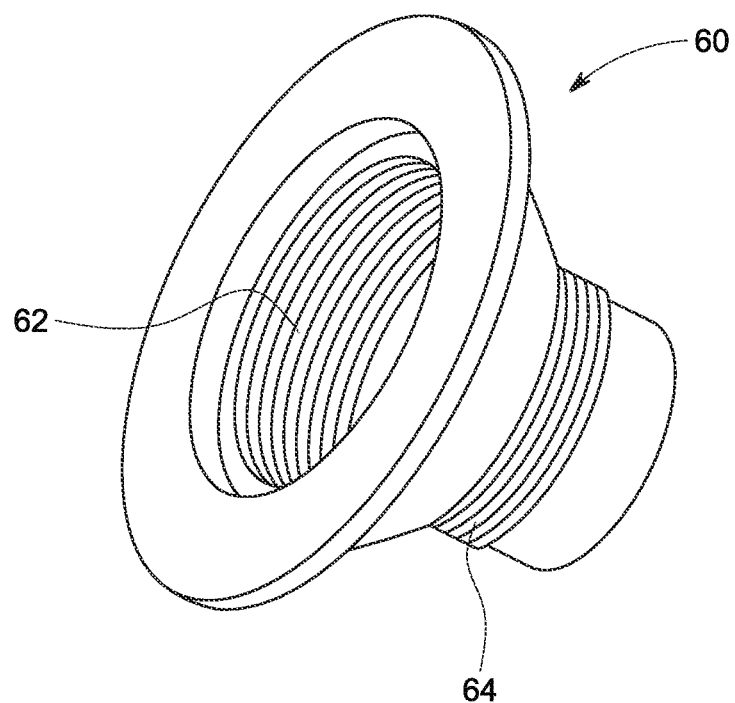
FIG. 2A is an illustration of the underwater wall fitting without the retrofittable underwater induction luminaire installed.
Figure 2B:
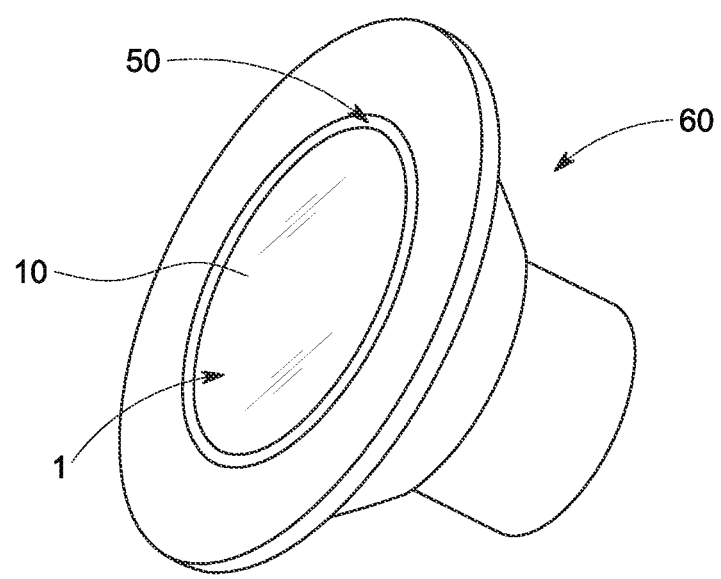
FIG. 2B is an illustration of the underwater wall fitting with the retrofittable underwater induction luminaire installed, in accordance with the first exemplary embodiment of the present disclosure.

FIGS. 2A-2B are illustrations of the underwater wall fitting 60 without and with the retrofittable underwater induction luminaire 1 installed. FIG. 2A shows an exemplary underwater wall fitting 60 used in aquatic lighting. Other wall fittings may also be used without departing from the scope of this disclosure. The wall fitting 60 in FIG. 2A has an interior recess with interior threading 62, and an exterior surface with exterior threading 64. The exterior surface may engage with a retaining surface of an aquatic body, such as the surface of a pool, spa, pond, fountain, and the like. The threading 64 may allow the wall fitting to be fixed to the surface of the aquatic body. The interior threading 62 may engage with exterior threading of the transmitter coupling structure 30, as discussed relative to FIGS. 1A-1B, above.

FIG. 2B shows the underwater wall fitting 60 when the luminaire 1 has been installed within the fitting 60. Relative to FIGS. 1A-2B, the luminaire 1 may be placed within the wall fitting 60 by first inserting the transmitter coupling structure 30 while it is attached to the receiver coupling structure 50 and the light module 10. The luminaire 1 may screw into the threading 62, creating a flat, flush seal.

The luminaire 1 may be retro-fitted into existing light niches and wall fittings currently in use in swimming pools, spas, fountains, and ponds. The luminaire 1 may achieve a flush insertion between the transmitter coupling structure 30 and the receiver coupling structure 50 to create a low profile when placed in existing installation areas where there may be a limitation in the depth of the niche or wall fitting. In one example, the induction transmitter 20 may have a minimum profile depth of about 18 mm into the existing installation space.

Wall fittings of this type and size have been installed with a substantial number of lighting systems over the past thirty years. They were originally designed for use with legacy fiber optic lighting systems. As lighting technology has advanced, the design and form factor of luminaires has changed. While it is relatively easy and inexpensive to obtain a new style of luminaire, it is much more difficult to change the size of a wall fitting once installed within a pool, spa, or other aquatic system. The luminaire 1 overcomes this difficulty by retro-fitting with existing wall-fitting form factors without the need for additional space. For example, an exemplary wall fitting may have dimensions of about 1.5"FPT×1.5" slip length. The usable space within the wall fitting may, in most situations, not be more than about 1.75 inches. In other situations, the usable space within the wall fitting may be less than 2.5 inches, less than 2.25 inches, less than 2.0 inches, less than 1.50 inches, or another length. When longer luminaires requiring closer to 4 inches of working space are used, additional space must be created behind the wall fitting, or wider diameter conduit must be used to contain the rest of the luminaire. However, the luminaire 1 of the present disclosure is advantageous in that it can be retro-fitted to use only the available space of the wall fittings already in use in many installations, all while still being able to supply the light output desired by the consumer. Additionally, as discussed in FIG. 6 below, the luminaire 1 may also be used in conjunction with smaller diameter conduit, which is both cheaper and easier to install.

Relative to FIGS. 1A-2B, the present disclosure can also be viewed as providing an induction system for use in a high-moisture environment. An induction system for use in a high-moisture environment may include an induction receiver having a planar coil to receive an induction signal from an induction transmitter. The planar coil of the induction receiver is in electrical communication with an electrical load, such as a light module, motor, or other electrical device. A moisture-tight or moisture-impervious housing structure houses the planar coil and has an interior recess formed on a sidewall thereof. At least a portion of the induction transmitter is positionable within the interior recess during transmission and reception of the induction signal. The electrical load may be any suitable load based on the electrical capacity of the system, for example, a light module, a motor, a loudspeaker, a computer system, and the like. Although a light module 10 is shown in FIGS. 1A-2B, any one or more additional types of electrical load may be powered by the system described herein.

It should be noted that a high-moisture environment may be a submerged or partially submerged environment, such as a pool, spa, lake, or fountain. A high-moisture environment may also be located near aquatic bodies, where significant moisture will be present around the luminaire. For example, walls, walkways, light posts, and the like, located proximate to pools, spas, lakes, or fountains, may be high-moisture environments where the luminaire and related system may be installed. A high-moisture environment may also be any environment subjected to high humidity, such as saunas, cave interiors, rain forests, and the like. The luminaire and related system disclosed herein is designed to operate under any conditions where moisture is at risk of entering the coupling structure and interacting with sensitive electronic components.

Figure 3A:
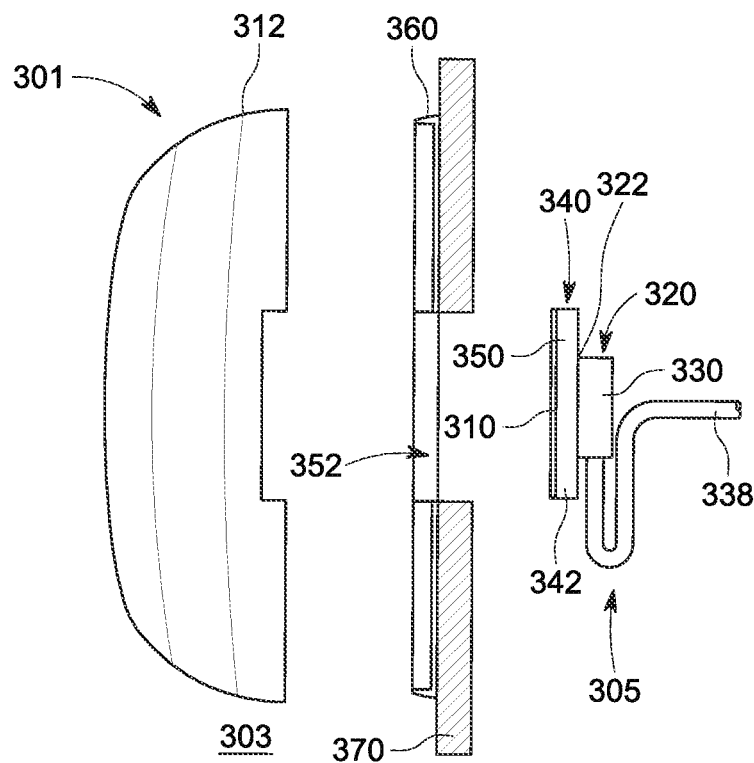
FIG. 3A is an exploded cross-sectional illustration of an induction lighting system for use in high-moisture environments, in accordance with a second exemplary embodiment of the present disclosure.
Figure 3B:
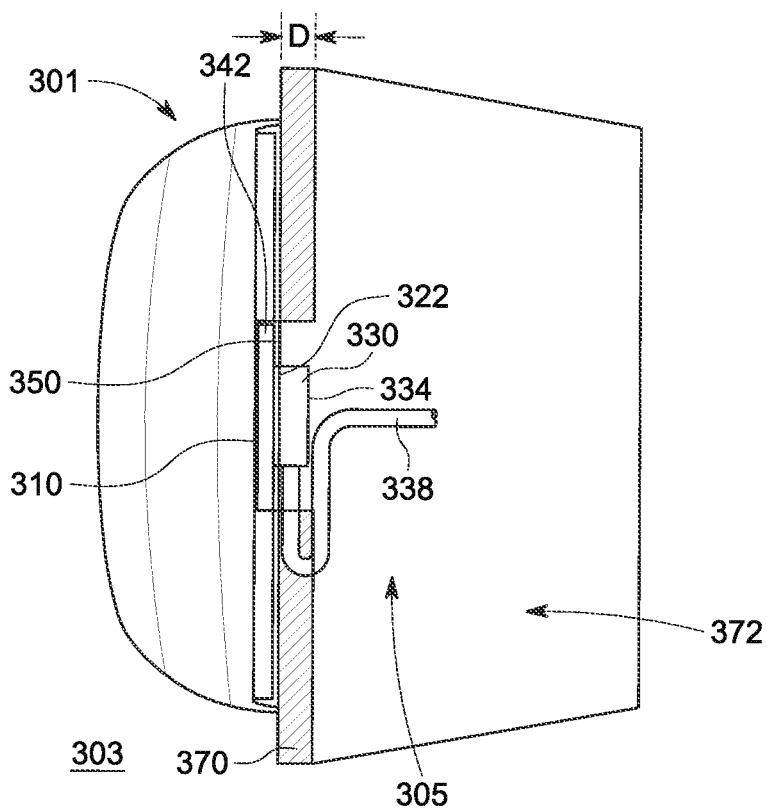
FIG. 3B is a cross-sectional illustration of an induction lighting system for use in high-moisture environments, in accordance with the second exemplary embodiment of the present disclosure.

FIGS. 3A-3B are exploded cross-sectional and cross-sectional illustrations of an induction lighting system 301 for use in high-moisture environments, in accordance with a second exemplary embodiment of the present disclosure. FIG. 3A shows the system 301 in an exploded cross-sectional view. The induction lighting system 301 includes an aquatic body 303 and an induction luminaire 305. The underwater induction luminaire 305 includes a light module 310, an induction transmitter 320 having a first planar coil 322, and an induction receiver 340 having a second planar coil 342 to receive an induction signal from the first planar coil 322. The induction receiver 340 is in electrical communication with the light module 310. The induction receiver 340 provides power from the received induction signal to the light module 310. A transmitter coupling structure 330 houses the induction transmitter 320. A receiver coupling structure 350 houses the induction receiver 340.

In the example shown in FIG. 3A, the system includes a wall mount 360 to hold the receiver coupling structure 350. The wall mount 360 has an interior recess 352 at the center of the mount 360 large enough for the receiver coupling structure 350 to fit within. The receiver coupling structure 350 may be attached to the transmission coupling structure 330. In one example, the flat outer surfaces of the coupling structures 330, 350 may be placed against each other, as shown in FIG. 3A. In another example, the transmitter coupling structure 330 may be located inside a recess within the receiver coupling structure 350, as shown in FIGS. 1A-1B. When placed together, the induction transmitter and receiver pair 320, 340 may be mounted within the recess 352.

The system 301 may include a light module 310, as described relative to FIGS. 1A-1B, above. The light module 301 may be affixed to the induction receiver 340 and may be in electrical communication with the induction receiver 340. The light module may also work together with a lens 312, which may expand and focus the light from the light module 310 as well as protect the components of the light module 310 from harm while installed. The lens may be fused to the receiver coupling structure 350 by any suitable means, including induction welding, epoxy, and the like. The system 301 also includes a power source 338 in electrical communication with the induction luminaire 305.

The aquatic body 303 may be any size, number, and type of aquatic installations, such as one or more pools, ponds, spas, fountains, channels, and the like. The aquatic body 303 may have a surface 370 retaining the water in the aquatic body 303. The surface 370 may have an interior niche 372, as shown in FIG. 3B, or a wall fitting (shown in FIGS. 2A-2B) for engagement with the luminaire 305. It should be noted that the surface 370 of the aquatic body 303 may be either interior—i.e., the surface holding the water in the body—or exterior—i.e., side and top surfaces, decks, and walls in proximity to the aquatic body. The system 301 can be installed within any such surface.

FIG. 3B shows the luminaire 305 within the interior recess 352 of the wall mount 360. The transmitter coupling structure and receiver coupling structure 330, 350 are engaged with the wall mount 360 within the lighting niche 372. The transmitter coupling structure 350 has a rear surface that extends into the underwater lighting niche 372 not more than a predetermined distance D, such as 1.75 inches. In the example shown in FIG. 3B, the transmitter coupling structure 350 may extend substantially less than 1.75 inches into the lighting niche 372.

It should be noted that the luminaire 1 shown in FIGS. 1A-2B can also be used with the underwater induction lighting system 301. Instead of mounting the coupled induction transmitter and receiver 320, 340 on the wall mount 360 and within the niche 372, the induction transmitter and receiver 20, 40 may be installed within the wall fitting 60 and placed within the surface 370 of the aquatic body. In this way, multiple form factors of the luminaire 1, 305 may be used in conjunction with the system 301.

Figure 4:
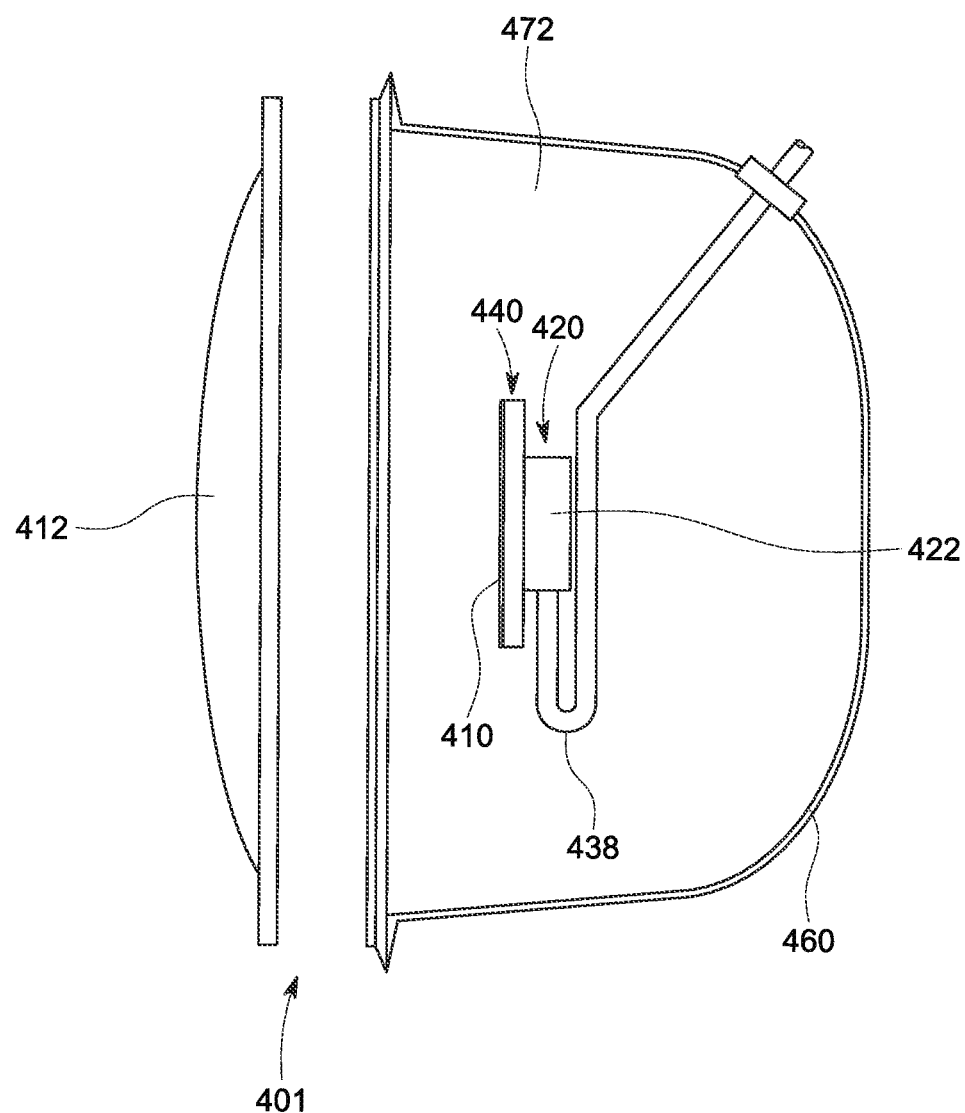
FIG. 4 is an exploded cross-sectional illustration of a retrofittable underwater induction luminaire in a swimming pool niche, in accordance with the second exemplary embodiment of the disclosure.

FIG. 4 is a cross-sectional illustration of a retrofittable underwater induction luminaire 401 in a swimming pool niche 460, in accordance with the second exemplary embodiment of the disclosure. The luminaire 401 may include the same components discussed relative to FIGS. 1A-3B above, including an induction transmitter 420, induction receiver 440, light module 410, lens 412, and power source 438. The luminaire 401 may be housed within a niche 460, which may create an enclosed space 472 to environmentally protect the luminaire 401 while installed. Due to the luminaire's 401 small size and minimum extension into the niche 460, the luminaire 401 may be retrofitted into a number of sizes of existing niches without the need to replace them or to create additional space by demolition, digging, or rebuilding.

Figure 5:
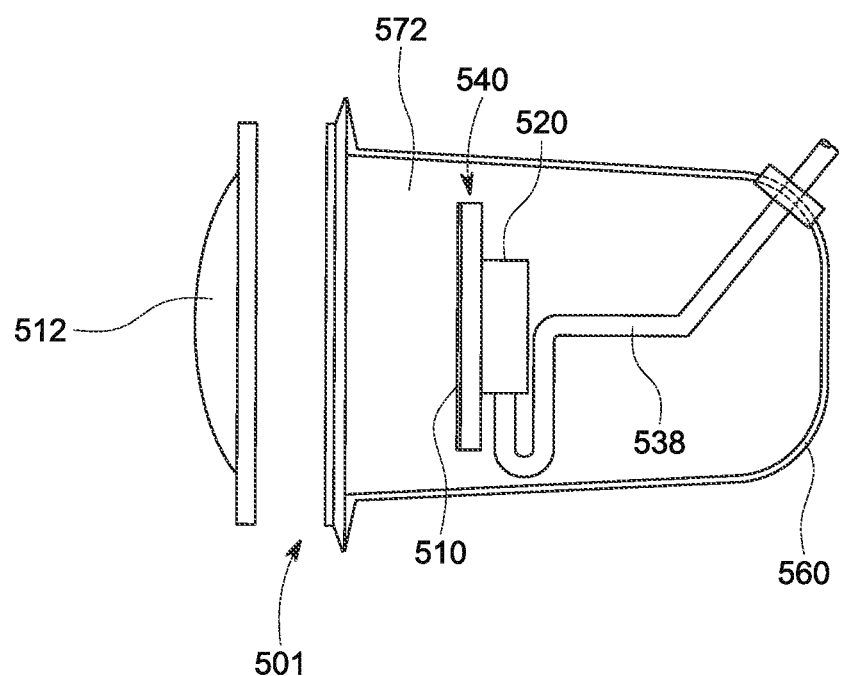
FIG. 5 is a cross-sectional illustration of the apparatus of FIG. 4 within a spa niche, in accordance with the second exemplary embodiment of the present disclosure.

FIG. 5 is a cross-sectional illustration of the luminaire apparatus 501 of FIG. 4 within a spa niche 560, in accordance with the second exemplary embodiment of the present disclosure. The luminaire 501 may include the same components discussed above, for example, a light module 510, lens 512, induction transmitter 520, induction receiver 540, and a power source 538. The spa niche 560 may house the luminaire 501, creating an enclosed space 572. The size and shape of the spa niche 560 compared to the pool niche 460 in FIG. 4 may be considerably smaller due to the size and shape of a spa structure.

Relative to FIGS. 4-5, the luminaire 401, 501 may be installed within the niche 460, 560 in any suitable manner. For example, the luminaire 401, 501 may be simply placed within the niche 460, 560 without being affixed to any portion of the niche 460, 560. As another example, the luminaire 401, 501 may be installed with threaded receivers, snap fittings, or bayonet-style or push-release locking fittings (not shown). As another example, the power source 438, 538 may be contained within a rigid or semi-rigid conduit, which may help to position the luminaire 401, 501.

Figure 6:
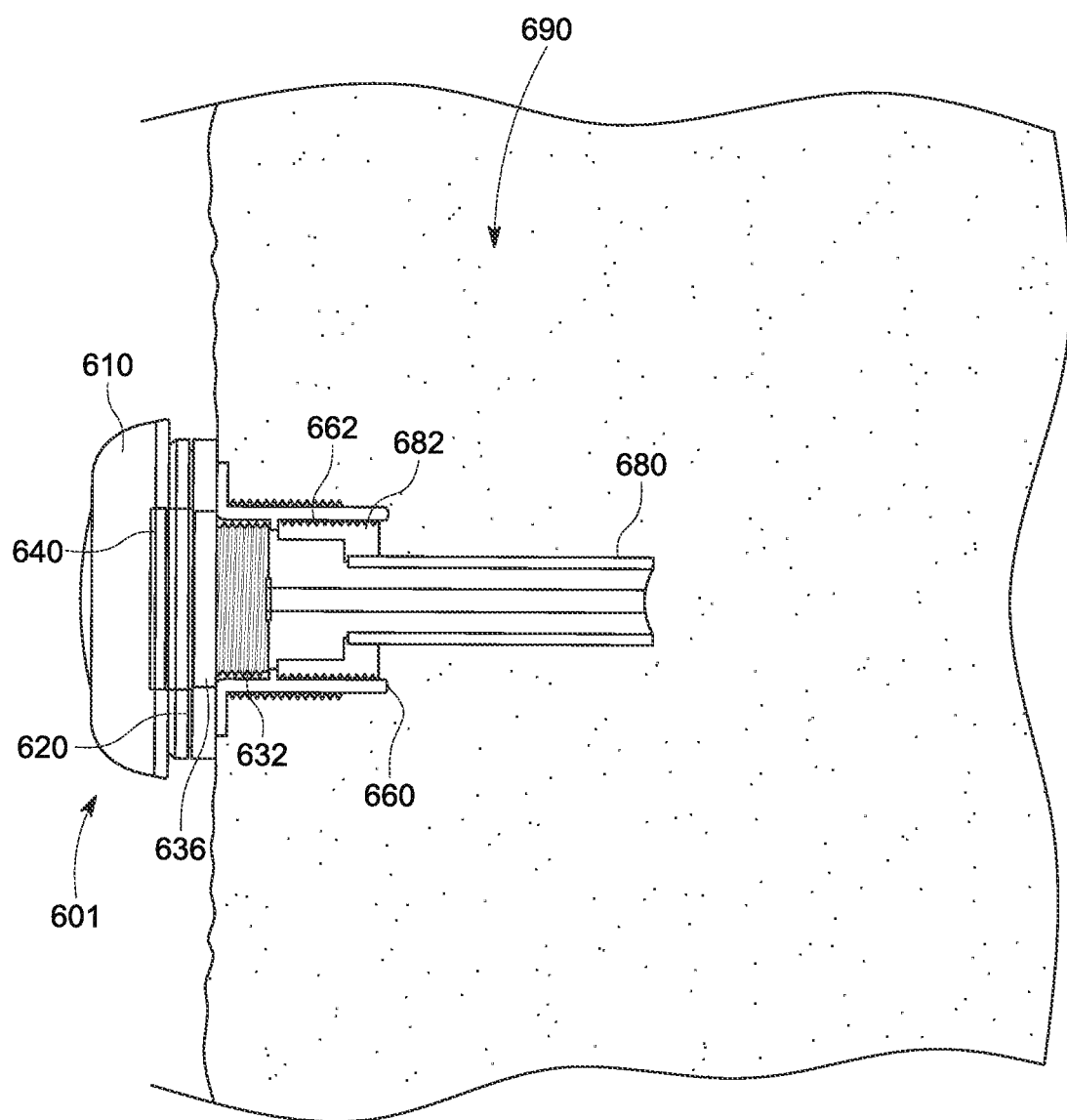
FIG. 6 is a cross-sectional illustration of the apparatus of FIG. 1A with a reduction adapter, in accordance with the first exemplary embodiment of the present disclosure.

FIG. 6 is a cross-sectional illustration of the luminaire apparatus 601 of FIG. 1A with a reduction adapter 682, in accordance with the first exemplary embodiment of the present disclosure. As discussed above, the luminaire 601 may be retrofitted to engage with a number of standard conduit sizes used within the concrete or cementous wall 690 of a swimming pool, spa, or other body of water. As shown in FIG. 6, the luminaire 601 may be adapted to fit with a ¾ inch conduit 680, which is generally smaller than most conduit lines commonly used in aquatic lighting systems. This may be advantageous in a number of ways. For example, a smaller conduit line may be easier to run, and thus may be located in areas where a larger conduit line could not be run. As another example, it may be substantially cheaper to run a smaller conduit line, which may enable lighting to be located where it would otherwise be too expensive. As another example, the overall cost and complexity of lighting may be reduced.

The luminaire 601 may include any combination of the components discussed relative to FIGS. 1A-5, above, including a light module 610, an induction transmitter 620, and an induction receiver 640. A portion 636 of the induction transmitter 620 may fit within an interior recess of the induction receiver 640. An exterior portion 632 of the induction transmitter 620 may engage with a wall fitting 660. A reduction adapter 682 may be threaded into the wall fitting 660 using external threads 662. The reduction adapter may be engaged with a reduced size conduit 680. It should be noted that the reduction adapter 682 and reduced size conduit 680 are not limited to ¾ inch diameter conduit, but may be any suitable diameter for housing cable from a suitable power source.

Figure 7:
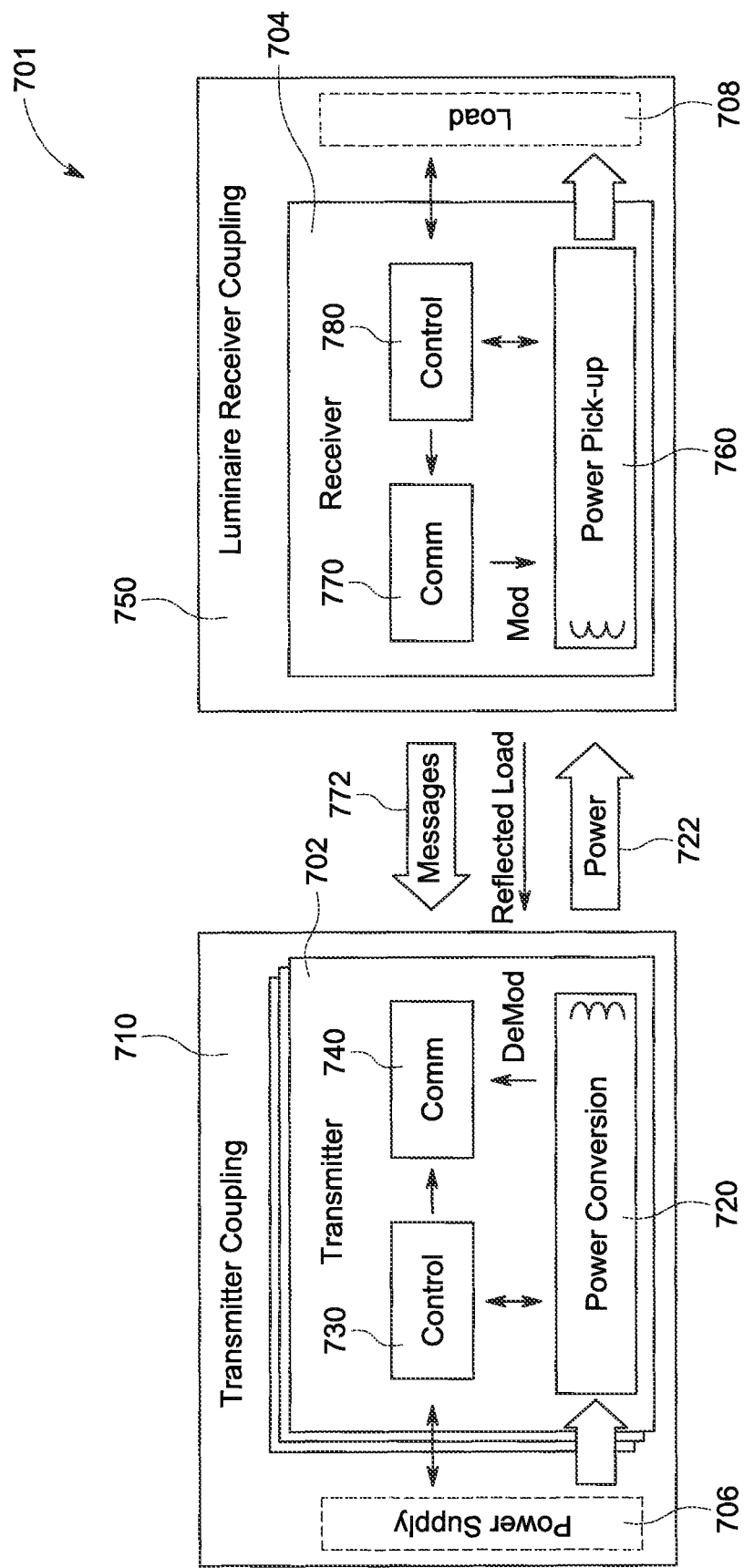
FIG. 7 is a box diagram of the electronic systems of the retrofittable underwater induction luminaire, in accordance with the first exemplary embodiment of the present disclosure.

FIG. 7 is a box diagram 701 of the electronic systems of the retrofittable underwater induction luminaire, in accordance with the first exemplary embodiment of the present disclosure. With reference to FIGS. 1A-1B, the luminaire 1 may include a transmitter coupling structure 710 and a receiver coupling structure 750. The coupling structures 710, 750 may house electronic components that regulate and control the incident power signal from the power supply 706, the transmitted power signal 722, the outgoing power signal to the load 708, and messages 772 between the transmitter and receiver.

The transmitter coupling structure 710 may include a number of electronic systems. FIG. 7 shows a power supply system 706, a power conversion system 720, a control system 730, and a communications system 740. The receiver coupling structure 750 may include a number of electronics systems as well, including a power pick-up system 760, a communications system 770, and a control system 780, and a load system 708. The control systems 730, 780 may include components common to digital control units, including logic elements, microcontrollers, printed circuit boards, and the like (not shown). The operation of the control systems 730, 780 is discussed in greater detail below. The operation and hardware components of the remaining systems are discussed in greater detail with respect to FIGS. 8-10, below.

Figure 8:
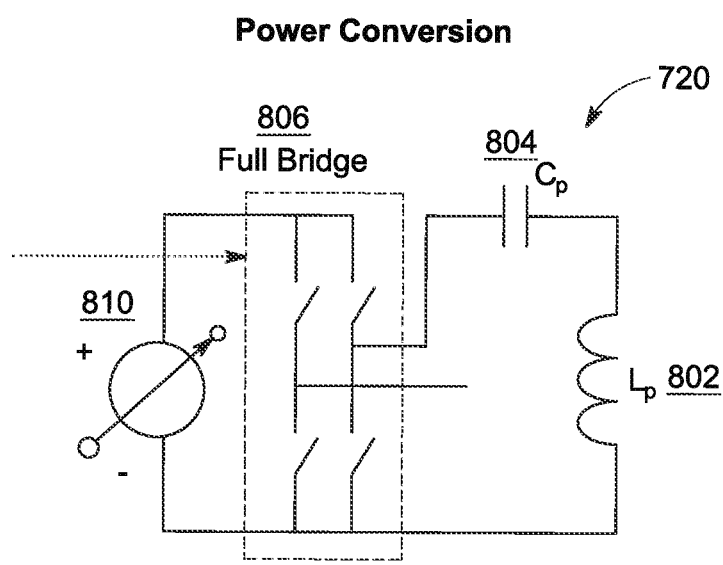
FIG. 8 is a circuit diagram of the power conversion system of the retrofittable underwater induction luminaire, in accordance with the first exemplary embodiment of the present disclosure.

FIG. 8 is a circuit diagram of the power conversion system 720 of the retrofittable underwater induction luminaire, in accordance with the first exemplary embodiment of the present disclosure. The induction transmitter may include a power conversion system 720 for converting incident electrical power 810 to wireless power. The transmitter's power conversion system 720 may include electronic components to direct and modify the electrical signal. In one example, a transmitter coil 802 and a serial resonance capacitor 804 are connected in series with an inverter 806, which may be a full-bridge or other directional circuit control mechanism. The power conversion system 720 may control the output signal by frequency switching, voltage switching, or any other suitable method.

Figure 9:
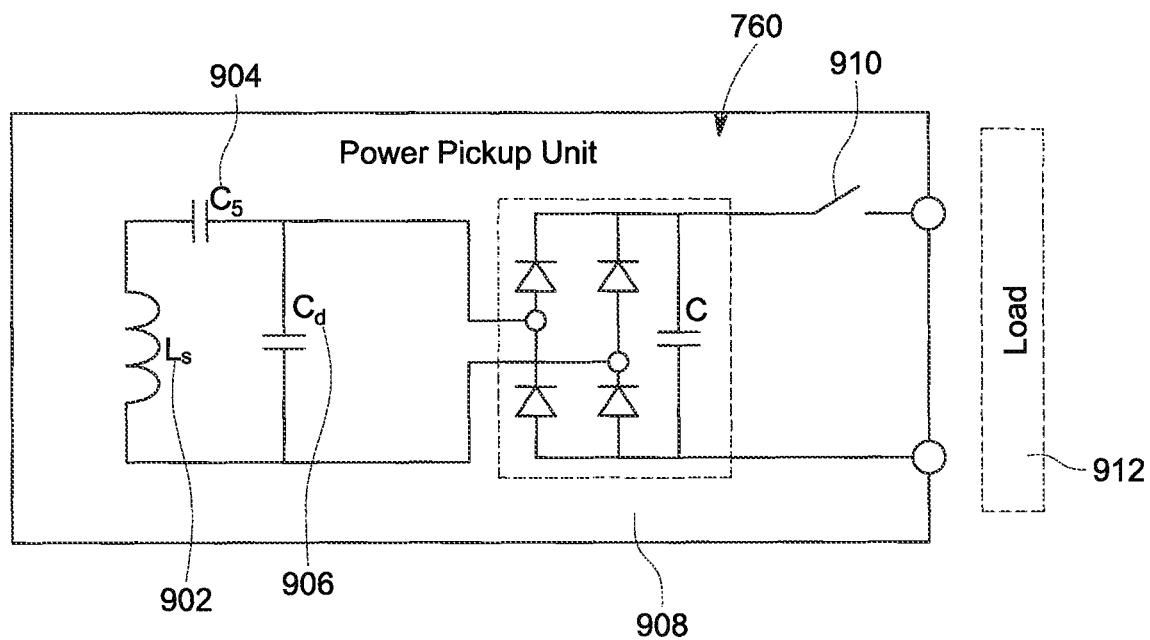
FIG. 9 is a circuit diagram of the power pickup system of the retrofittable underwater induction luminaire, in accordance with the first exemplary embodiment of the present disclosure.

FIG. 9 is a circuit diagram of the power pickup system 760 of the retrofittable underwater induction luminaire, in accordance with the first exemplary embodiment of the present disclosure. The induction receiver may include a power pick up system 760 for converting incident wireless power from the induction transmitter to electrical power for the load 912, which may be a light or other electrical load. The power pick up system 760 may include electronic components to direct and modify the wireless power signal. In one example, a receiver coil 902 and a serial resonance capacitor 904 are connected in series, while a parallel resonance capacitor 906 is connected in parallel. The parallel resonance capacitor 906 may be used to detect and measure the power running through the power pick up system 760. This circuit may be connected to a rectifier 908, which may be a full-bridge rectifier using either diodes or switches, as well as a capacitor. The circuit may next be connected to an output switch 910 that allows the load 912 to be disconnected from the power pickup unit 760 circuit.

Figure 10:
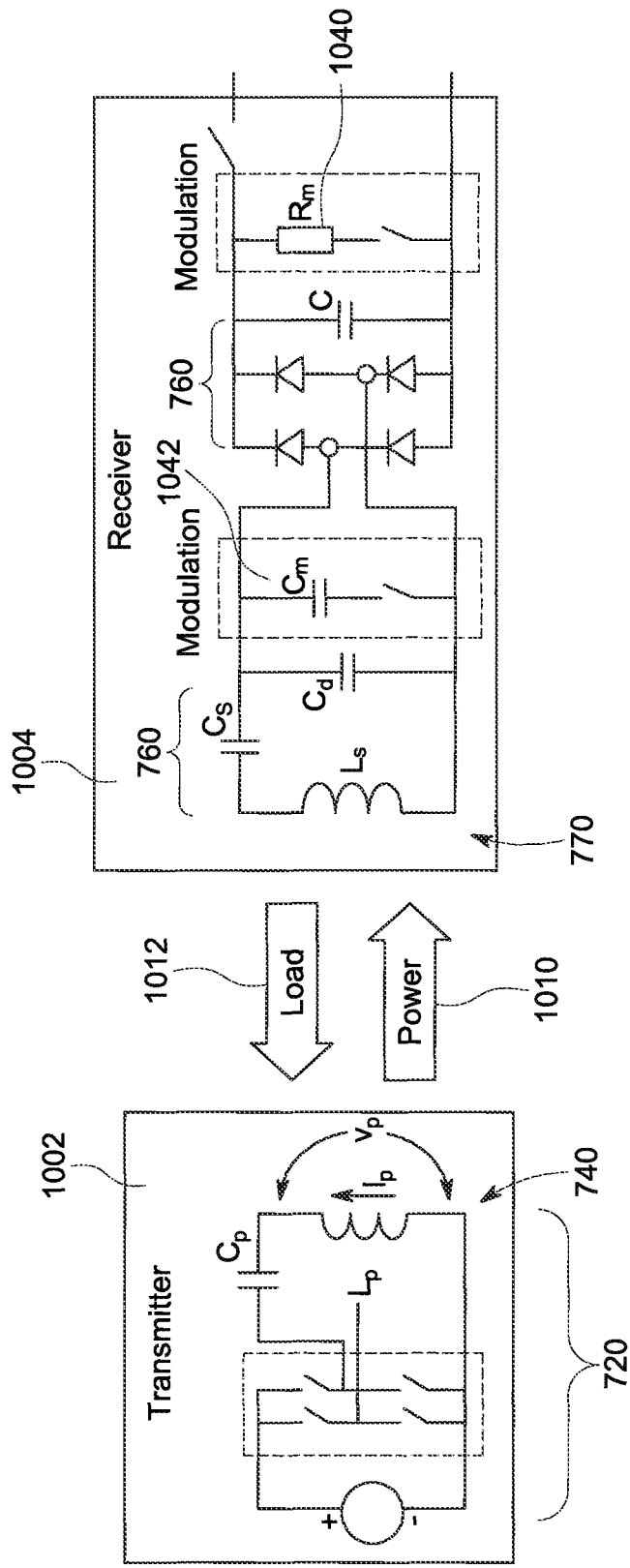
FIG. 10 is a circuit diagram of the communication systems of the retrofittable underwater induction luminaire, in accordance with the first exemplary embodiment of the present disclosure.

FIG. 10 is a circuit diagram of the communication systems 740, 770 of the retrofittable underwater induction luminaire, in accordance with the first exemplary embodiment of the present disclosure. The communication systems 740, 770 may allow the induction receiver 1004 to communicate with the induction transmitter 1002, and vice-versa. The communication systems 740, 770 may also include radio frequency transmitters (not shown) and receivers each in communication with the induction transmitter and the induction receiver 1002, 1004. The radio frequency components may include antennas, microcontrollers, logic components, printed circuit boards, and other electronic components.

The induction receiver 1004 may send messages to the induction transmitter 1002, providing power level control information. In one example, messages may be encoded by load modulation of the power signal 1010. This may create a reflected load signal 1012 that may be detected by the induction transmitter 1002 through a radio frequency antenna on the induction transmitter. In implementation, the modulation circuit may include a switching modulation resistor 1040 or a switching modulation capacitor 1042 in communication with other portions of the power pickup system 760. The induction transmitter 1002 may receive messages from the induction receiver 1004 by detecting the reflected load signal and de-modulating it. In implementation, demodulation may occur by sensing one or both of the transmitter coil voltage or the transmitter coil current using the power conversion circuit 720.

In one example, the modulated signal 1012 may contain binary data, encoded using bi-phase bit encoding. A byte may have an encoding structure comprised of several bits, for instance, a start bit, a series of data bits, a party bit, and a stop bit. Messages may be communicated in packets of bytes encoded by the modulation. In one example, the packet may be structured as follows: a preamble comprising a number of bits, a header comprising a byte, a message comprising a number of bytes, and a checksum comprising a byte.

Referring to FIGS. 7-10, the communication 740, 770 and control systems 730, 780 may work together to communicate and adjust the power within the induction transmitter 1002 and the induction receiver 1004 of the luminaire. For example, the induction transmitter 1002 may initially provide a test signal by sending an electrical signal through the transmitter coil 802. The transmitter's communication system 740 may sense for the presence of a potential receiver 1004 by waiting for a return signal to be communicated. The receiver's communication system 770 may remain in a standby mode waiting for the induction transmitter's 1002 test signal.

The induction receiver 1004 may indicate its presence by receiving the signal and communicating back the received signal strength to the induction transmitter 1002. The induction transmitter 1002 may receive this response. In one example, the induction receiver 1004 may communicate an identifier as well as its current power requirements. When the induction transmitter 1002 receives this message, it may configure the outgoing wireless power signal to the appropriate conditions. The induction transmitter 1002 may then send a wireless power signal to the induction receiver 1004, which may receive the signal and analyze it as discussed above. The control system 780 for the induction receiver 1004 may subsequently communicate required or desired changes to the power signal of the induction transmitter 1002, which may adjust the output signal in kind.

In one example, the induction transmitter 1002 may enter a standby power mode when the induction receiver 1004 is do-coupled from the induction transmitter 1002. The induction transmitter 1002 may search for the presence of an induction receiver 1004 while in standby mode. For instance, the induction transmitter 1002 may detect small changes in capacitance or resonance nearby, or the induction transmitter 1002 may transmit a digital ping and wait for a response. A capacitance change as low as 0.1 mW or a resonance change as low as 5 mW every 0.5 seconds may be enough to communicate the presence of the induction receiver 1004 and wake the induction transmitter 1002 from standby mode.

In one example, the transmitter and receiver communication systems 740, 770 may interpret some messages 772 as control errors rather than as control data points. When this happens, the induction transmitter 1002 may work to adapt the power level of the output signal lower or higher in order to eliminate the error by providing the correct power. Likewise, the induction receiver 1004 may calculate the nature and extent of the error by determining a difference between the desired power control point and the actual power being achieved. The induction receiver 1004 may communicate this difference as an error message for the induction transmitter 1002 to receive and interpret.

Figure 11A:
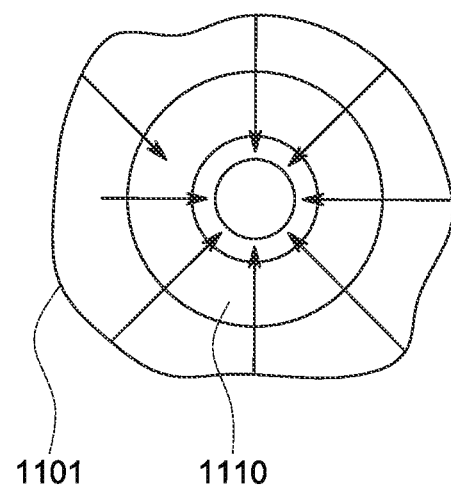
FIGS. 11A-11B are illustrations of the coil placement of the retrofittable underwater induction luminaire, in accordance with the first exemplary embodiment of the present disclosure.
Figure 11B:
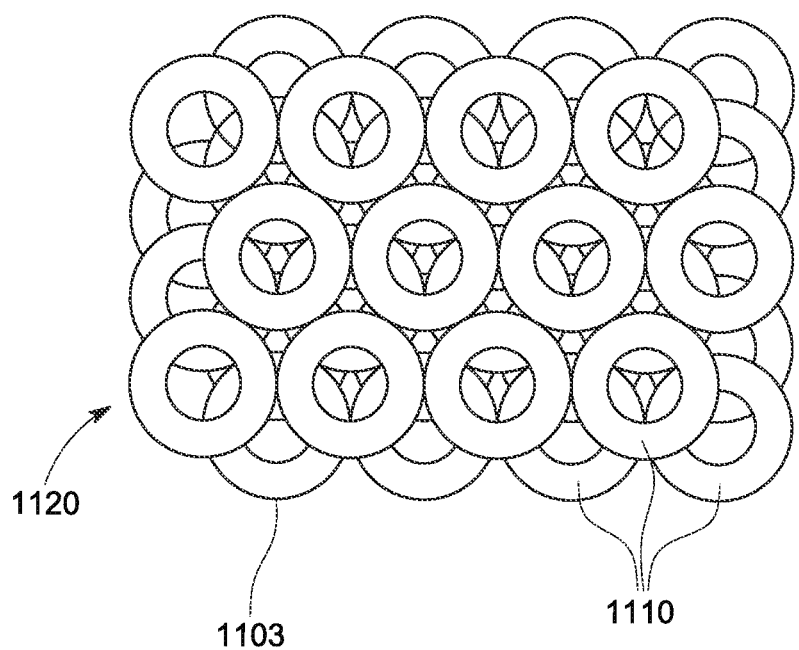

FIGS. 11A-11B are illustrations of the coil placement of the retrofittable underwater induction luminaire, in accordance with the first exemplary embodiment of the present disclosure. FIG. 11A shows a single planar coil 1110 arranged within a coupling structure 1101. The induction transmitter 20 and induction receiver 40 of FIG. 1A may use this single coil arrangement in one example.

FIG. 11B shows a coil array 1120, where a number of coils 1110 are arranged within a coupling structure 1103. The arrangement of the coils 1110 may depend upon the function of the luminaire. For example, where a luminaire includes a light module having RGB colors, each activated by an individual coil, the coils 1110 may be arranged such that they are physically separated enough to minimize cross-induction with the coils of other colors. In one example, the coils 1110 may all be the same size, shape, and number of turns, as shown in FIG. 11B. In another example, the coils 1110 may have different characteristics such that their resonant frequencies are non-trivially different. For instance, in the example with the individual RGB controls, the red receiver coils may have one resonant frequency, while the green receiver coils have another, and so on for the blue receiver coils. This may allow the colors to be controlled separately without requiring spatial separation.

Good coupling structure between the transmitter coil and the receiver coil may be achieved by optimizing a number of factors. For instance, coils of similar size, material, thickness, and shape may achieve more efficient transfer of electrical power. As another example, the planar nature of the coils may ensure a short distance between them. Likewise, thinner housing materials may allow an optimal distance between the coils. Further still, a flat housing interface between the coils may optimize the interaction of the electric and magnetic fields. As another example, magnetic-permeable housing material may improve transfer of the wireless signal between the induction receiver and the induction transmitter.

As another example, proper alignment of the coils may optimize the transferred signal. For instance, in an implementation having a single transmission coil and a single receiver coil, both coils may be axially aligned and fixed in place to maintain the alignment when the induction receiver and induction transmitter are installed together in the luminaire. In another implementation, the induction transmitter, the induction receiver, or both may include a coil array, as shown in FIG. 11B. The induction transmitter may include a coil array having a number of coils placed within a housing. The induction receiver may include a single free coil capable of moving within the housing. Coils in the coil array may be selectively activated depending on the location of the single free coil.

As shown relative to FIGS. 1A-1B, the power source 38 may include a minimum of two wires to the induction transmitter 20. This may allow for simple on-off control of the luminaire. In another example, the power source may include a minimum of four wires to the induction transmitter. The four wires may be used in the embodiment described relative to FIG. 11B, above, wherein each color of an RGB array is individually controllable. The four wires may provide power to control the three colors in the array, as well as a wire for a white light control. Each of the three RGB wires may be in communication with a transmitter coil dedicated to a particular color, while the white wire may be in communication with all coils. This may allow a user to dynamically control the color and intensity of light emitted from the light module. In another example, additional wires may be included. For instance, a 5-wire embodiment may allow a user to dynamically control each of the RGB colors as well as cool white and warm white lights having different color temperatures. This may allow a user to mix, change, and blend colors to suit very specific moods, tones, or times of day.

In one example, the luminaire and the system may be controlled by a user with a remote control. The remote may use a wireless radio frequency to transmit commands to the transmitter. The wireless frequency may be a frequency that is highly transmissive through water, such as frequencies at about 27 MHz and the like. In another example, the luminaire may be connected to a smart outlet which is capable of receiving and communicating commands from the outlet of the power source directly. This may allow installations with simpler systems, for example, those having only two electrical wires from the outlet to the luminaire, to have more robust controls. The wireless commands may be frequency or amplitude modulated from the remote and may be demodulated by the luminaire or the smart outlet. The wireless commands may include instructions to turn one or more lights on, off, brighter, dimmer, or different colors. Lights may be controlled individually or within groups. Users may pre-set groups of lights, dimmer and color settings, and the like.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A retrofittable underwater induction luminaire system, comprising:
    an induction transmitter having a first planar coil;
    a transmitter coupling structure housing the induction transmitter, wherein an exterior of the transmitter coupling structure is configured to engage with at least one of: an interior of an underwater wall fitting and an interior of an underwater lighting niche, wherein the transmitter coupling structure has a rear surface, and wherein the rear surface extends into at least one of the wall fitting and the underwater lighting niche not more than a predetermined distance;
    a light module;
    an induction receiver having a second planar coil to receive an induction signal from the first planar coil, wherein the induction receiver is in electrical communication with the light module, and wherein the induction receiver provides power from the received induction signal to the light module; and
    a receiver coupling structure housing the induction receiver and having an interior recess, the receiver coupling structure being moisture-impervious, wherein a portion of the transmitter coupling structure housing the first planar coil is removably positionable within the interior recess.

2. The retrofittable underwater induction luminaire system of claim 1, wherein the induction transmitter is removably mechanically separable from the receiver coupling structure and the light module.

3. The retrofittable underwater induction luminaire system of claim 1, wherein the induction receiver is positioned within a housing of the light module.

4. The retrofittable underwater induction luminaire system of claim 1, wherein the predetermined distance is less than 1.75 inches.

5. The retrofittable underwater induction luminaire system of claim 1, wherein the first and second planar coils share a resonant frequency.

6. The retrofittable underwater induction luminaire system of claim 1, wherein the portion of the transmitter coupling structure housing the first planar coil is located forwardly extended from a front face of the underwater wall fitting or a front face of the underwater lighting niche.

7. The retrofittable underwater induction luminaire system of claim 1, wherein when the portion of the transmitter coupling structure housing the first planar coil is positioned within the interior recess, a forward surface of the first planar coil and forward surface of the second planar coil are positioned parallel and co-axial to one another.

8. An induction lighting system for use in high-moisture environments, comprising:
   an aquatic body;
   an induction luminaire, comprising:
      an induction transmitter having a first planar coil;
      a transmitter coupling structure housing the induction transmitter;
      a light module;
      an induction receiver having a second planar coil to receive an induction signal from the first planar coil, wherein the induction receiver is in electrical communication with the light module, and wherein the induction receiver provides power from the received induction signal to the light module; and
      a receiver coupling structure housing the induction receiver and having an interior recess, the receiver coupling structure being moisture impervious, wherein a portion of the transmitter coupling structure housing the first planar coil is removably positionable within the interior recess;
   a power source in electrical communication with the induction luminaire; and
   at least one of: a wall fitting and a lighting niche, located at a wall or floor of the aquatic body, wherein the transmitter coupling structure is engaged with the at least one of the wall fitting and the lighting niche, and wherein the transmitter coupling structure has a rear surface that extends into the at least one of the wall fitting and the underwater lighting niche not more than a predetermined distance.

9. The induction lighting system of claim 8, wherein the induction transmitter is removably mechanically separable from the receiver coupling structure and the light module.

10. The induction lighting system of claim 8, wherein the induction receiver is positioned within a housing of the light module.

11. The induction lighting system of claim 8, wherein the predetermined distance is less than 1.75 inches.

12. The induction lighting system of claim 8, wherein the first and second planar coils share a resonant frequency.

13. The induction lighting system of claim 8, wherein the portion of the transmitter coupling structure housing the first planar coil is located forwardly extended from a front face of the underwater wall fitting or a front face of the underwater lighting niche.

14. The induction lighting system of claim 8, wherein when the portion of the transmitter coupling structure housing the first planar coil is positioned within the interior recess, a forward surface of the first planar coil and a forward surface of the second planar coil are positioned parallel and co-axial to one another.

* * * * *